Patented Aug. 3, 1943

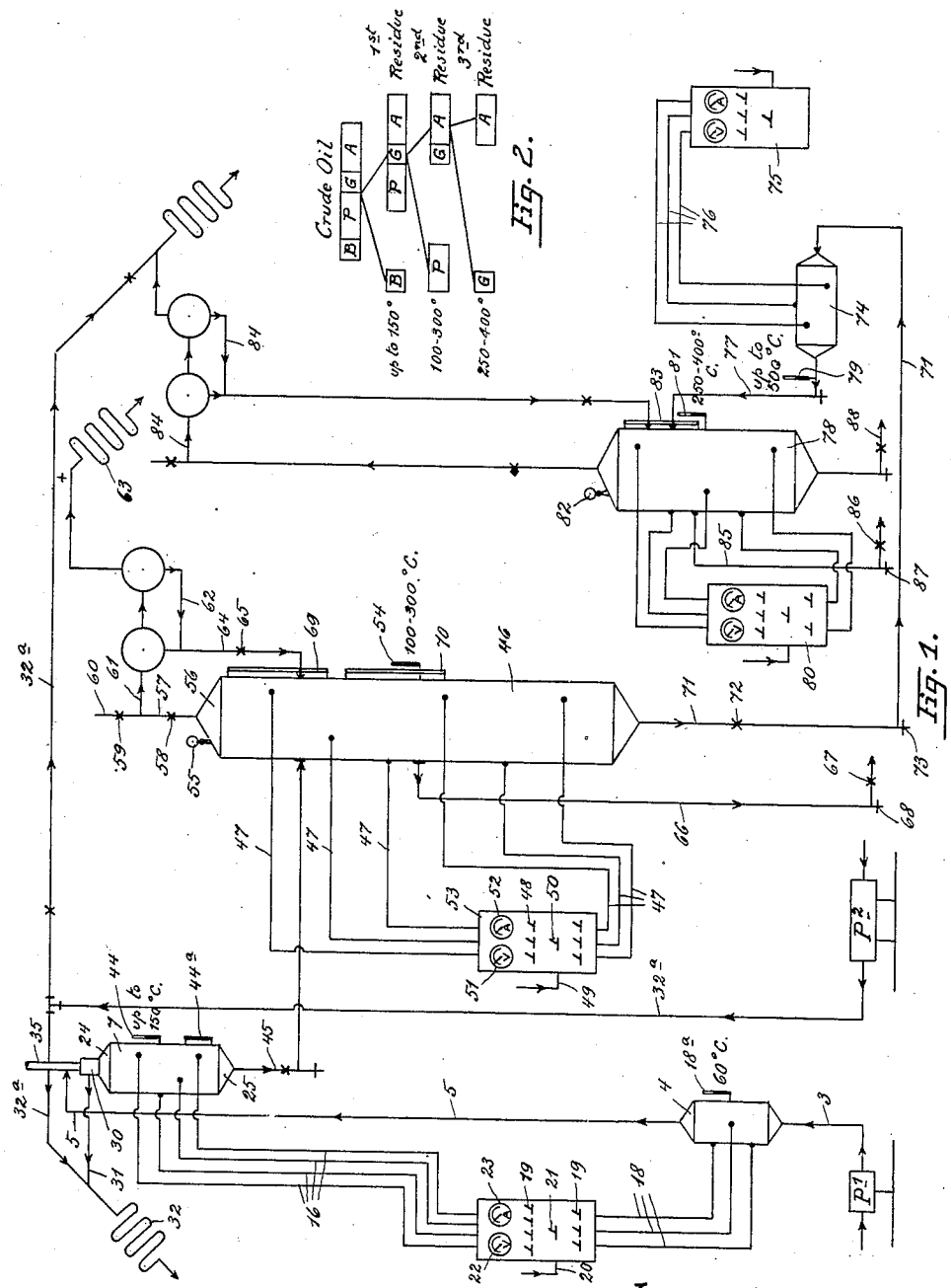

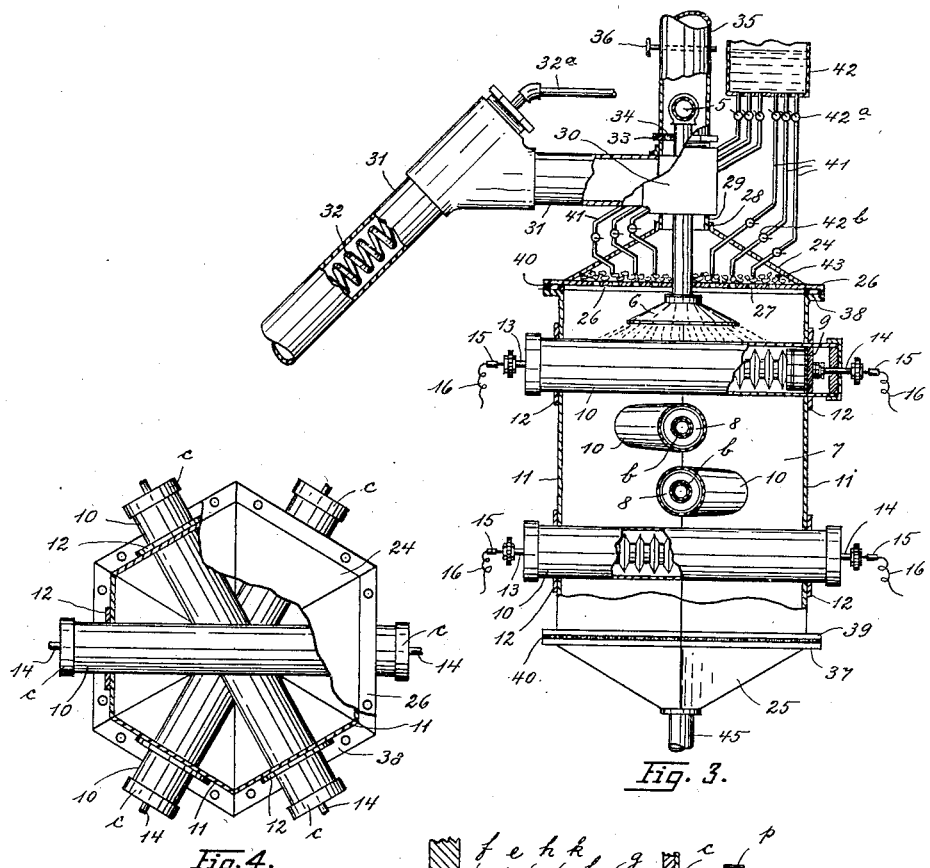

2,326,032

UNITED STATES PATENT OFFICE 2,326,032

LOW PRESSURE REFINING AND CRACKING PLANT FOR HYDROCARBONS

William Homfeldt, Azcapotzalco, Mexico

Application February 25, 1941, Serial No. 380,558

1 Claim. (Cl. 201—50)

The present invention refers to improvements in low pressure refining and cracking plants for hydrocarbons for obtaining gasoline, kerosene, gas oil and other components of crude oil, and in which the heat necessary for the operation in the different phases is supplied by a novel system of electrical heating elements maintaining constant temperatures. The invention has for its object to provide a plant which completely refines the crude oil, with perfect control of the temperature in each phase of the process, a continuous automatic operation of the plant, purifying filters for the elimination of carbonaceous and other foreign matter from the gasoline, and a low cost of operation due to the electric heaters employed.

In the accompanying drawings:

Figure 1 is a schematical view of the whole refining plant.

Figure 2 represents schematically the different successive steps of the refining process.

Figure 3 is a sectional view of the cracking tank for gasoline with electric heaters and purifying system.

Figure 4 shows the same tank viewed from above, with the cover partly cut away and demonstrating the arrangement of the heating elements therein.

Figure 5 represents in partial section the inside construction of the electric heaters.

Figure 6 is a partly sectional view, on a bigger scale, of one of the terminals of a heating element with adjusting means for the electrodes.

As shown in Figure 1, the crude oil is raised by a pump P1 through a pipe 3 to a preheater tank 4, and from this tank it is introduced through a pipe 5 and a spray nozzle 6 (Figure 3) into the cracking tank 7. This tank has preferably a hexagonal shape and is provided inside with electric heaters 8 to be described in detail later, and which are centered by rings 9 of porcelain or other refractory material, in thin copper tubes 10 passing alternately through different opposite walls of the hexagonal body of the tank 7, as shown in Figure 4. Instead of a hexagonal tank, a square or any other polygonal tank may be used. The poles 13 and 14 of the heating elements 8 are connected by plugs 15 and cables 16 with the switchboard 17. This switchboard is also connected by cables 18 with the heating elements 8 of the preheater 4 which is provided with a thermometer 18ª. Each heating element 8 of the preheater 4 and of the cracking tank 7 has its own switch 19 on the switchboard 17, which is further provided with a main supply 20 for the current, a main switch 21, a voltmeter 22 and an amperemeter 23.

The cracking tank 7 is closed above and below by two conical covers 24 and 25, the upper cover 24 having a bottom 26 provided with holes 27 for the passage of the gasoline vapors and sulphureous vapors. The upper extremity of the cover 24 carries a short threaded tube 28 entering a T-connection 30 from which extends laterally the condenser tube 31 with inner refrigerating coil 32 connected through pipe 32ª with the water pump P2. The upper end of the T 30 is closed by a tubular cap 33 into which enters laterally the feed pipe 4 conducting the crude oil. The bottom of this cap 33 is provided with perforations 34 for the passage of sulphureous vapors. Above the cap 33 there is a tube or chimney 35 of suitable height through which escape the sulphureous vapors, gases, etc., the draft being regulated by a damper 36. The lower cover 25 has a hexagonal flange 37 which, as is also the flange 26 of the bottom of the upper cover 24, is fastened by screws to the flanges 38 and 39 of the tank 7, with packing rings 40 between adjacent flanges.

Into the upper cover 24 enter a number of pipes 41 descending from a tank 42 containing acids, each pipe 41 being provided with two valves 42ª and 42ᵇ, in order, during the operation of the plant, to spray acid on the lumps 43 of porous filtering material placed on the perforated plate 26 forming the bottom of the cover 24. On the tank 7 is further mounted a thermometer 44 and a gauge 44ª for controlling the temperature and height of the oil respectively.

The bottom of the lower cover 25 is connected by a pipe 45 with the vaporization tank 46, placed at a lower level than the tank 7 so that the residues of the tank 7 may flow freely and automatically into the tank 46 during the operation of the plant, as these residues should not stay in the cracking tank (which is easily verified by the gauge 44ª) as they would cover the heating tubes 10 and thus would produce an interruption in the cracking process. The vaporization tank 46 has the same kind of heating elements 8 as the tank 7, its tubes 10 having two-pole connections, through conductor cables 47 connected with the switches 48, supply mains 49 with main switch 50, voltmeter 51 and amperemeter 52 in switchboard 53 and has a thermometer 54. The upper cover 56 of the tank 46 is further provided with a manometer 55 indicating the low pressure existing in the plant and is connected with the vaporization pipe 57 provided with a shut-off valve 58. The pipe 57 continues upwardly, with another shut-off valve 59, and together with the chimney 60 serves as an escape for the sulphureous vapors and gases which may still be left. The pipe 61 united laterally with the pipe 57 is connected with the circulation pipe 62 serving as a syphon, and the pipe 62 itself is connected with the condenser system 63 receiving water from the pump P2 through the pipe 32ª. The pipe 64, with intermediate valve 65, which descends from the circulation pipe 62, returns to the vaporization tank 46. Depending upon the nature of the crude oil treated, the vaporization plant described may be used for obtaining an intermediate distillate. The lateral pipe 66 for petroleum distillate leaves the vaporization tank 46 at a given height and is provided with a shut-off or throttle valve 67. The control cock 68 mounted below the pipe 66 permits the withdrawal of petroleum distillate for assaying. The vaporization tank 46 is further equipped with two gauges 69 and 70. The first gauge 69 indicates principally the height of the cracking material, but at the same time also the color of the petroleum distillate. The second gauge 70 has for its object to control the height of the second residue (gas-oil-asphalt) which leaves automatically through the pipe 71, with intermediate valve 72 (the control cock 73 serves for extracting samples) and enters the electrical superheater 74. This finishes the process for the second distillation product (kerosene) and the third process follows, the production of gas oil.

The second residue (gas oil-asphalt) leaves automatically the vaporization tank 46, through the pipe 71, and enters the fractionation plant located at a still lower level, passing first through the superheater 74 for increasing the temperature, if necessary. The equipment of this tank is the same as in tanks 4, 7 and 46 with respect to heating elements 8 and tubes 10, and it is connected in the same way with the switchboard 75 by cables 76. The second residue (gas oil-asphalt) leaving the superheater 74, passes automatically through the pipe 77 to the fractionation tank 78. The connecting pipe 77 is provided with a thermometer 79 for reading the higher temperature obtained. The fractionation tank 78, electrically heated, is provided with the same electrical devices as the formerly described tanks, and has its own switchboard 80, thermometer 81, manometer 82, gauge 83 for indicating the height of the cracking material, the same type of vaporization system 84 as the vaporization tank 46 already described, its discharge pipe 85 with shut-off or throttle valve 86 and control cock 87, conducting to the respective refrigeration system, from which issues the gas oil (distillation product "G"). Finally there is the discharge pipe 88 with corresponding connections for the asphalt (third residue "A").

The refining plant described in the foregoing is intended principally for producing three distillation products, i. e. gasoline, kerosene, and gas oil, but, depending upon the nature of the crude oil, the two vaporization devices 46 and 78 may be used for producing also intermediate distillates. In Figure 2 is shown schematically the fractionation of the crude oil into its components B (gasoline), P (kerosene), G (gas oil) and A (asphalt), with the temperatures corresponding to each phase of the process.

Figures 3, 4, 5 and 6 illustrate the electrical heating elements used for heating the different fractions of the crude oil in the plant described. These elements employ a granulated resistance material composed of carbon (graphite), Carborundum and clay. For protecting this material against oxydation, it is saturated with solutions of tungsten or molybdenum salts. This material becomes incandescent when the electric current passes through it and can produce temperatures up to 3000° C. It has the advantage that the temperature is easily regulated by tightening or loosening the electrodes between which the material is placed, the increase in temperature depending upon the degree of compression to which the material is subjected. The temperature of the elements may further be varied by increasing or diminishing the electric current passing through the material, and the temperature may therefore be easily regulated within wide limits by employing one or both methods, i. e. compression of the material and changes in the electric current.

The granulated material $a$ is placed loosely in a tube $b$ of porcelain or other refractory material, surrounded by the iron tube 8 provided with cast on annular ribs. This tube 8 is placed within the copper tube 10, closed at both ends by caps $c$. The flanges $8^a$ on the ends of the tube 8 are united by screws, in an insulated manner, with the flanges $d$ of tubular members $e$ through which pass the electrodes $f$, the conical points of which contact the granulated resistance material $a$ of tube $b$. The closed end of the tubular member $e$ is tapped for the threads of a screw $g$, one reduced end of which enters the inner extremity of the electrode $f$ and is held by a lock nut $i$. The end of the tubular member $e$ is recessed for receiving the threaded end of a cylinder $j$, a packing $k$ and washer $l$ being placed between the two parts for providing an air-tight seal. Through this cylinder $j$ also passes the screw $g$. The opposite end of the cylinder $j$ receives a threaded plug $m$ which presses the packing $n$ around the screw $g$, forming another air-tight seal. The plain unthreaded end of the screw $g$ passes through a disc $o$ of insulating material placed within the cap $c$ and is provided with a hand wheel $p$ also made of insulating material, the extremity of the screw being perforated longitudianlly for receiving the plug 15. Within the copper tube 10, the tubular member $e$ is surrounded by a thick ring $r$ of refractory material which fills the tube 10 and prevents loss of heat from the element.

As the electric current passes through the granulated resistance material described, it becomes incandescent in a few seconds and the heating begins. The current consumption is in inverse proportion to the consumption in heaters with resistance wires, as in the latter the resistance increases with the temperature while the conducting power of the granulated material is higher with increasing temperatures. It must also be noted that a relatively big element need not receive the electric current constantly, as the resistance material and the inner porcelain tube are bad conductors of heat and therefore conserve the heat during a considerable time. The granulated resistance material should always be used in hermetically sealed heaters, like those described above, due to the fact that in these heaters the combustion of the carbon (graphite) is so much reduced that the element will have to be refilled only after having been used for more than six months.

The plant described in the foregoing operates as follows:

All the electric heating elements of the different tanks are first put in circuit by means of the switches on the respective switchboards. When the desired temperature has been reached in each tank, as shown by the thermometers, the pump $P^1$ for the crude oil and pump $P^2$ for the condensing water are started. The pump $P^1$ raises the crude oil to the preheater 4 where it is heated to make it more fluid so that it may leave the spray nozzle 6 in tank 7 in a finely divided state and be sprayed uniformly on the hot tubes 10 in said tank, starting the first cracking process, i. e. the obtaining of various gasolines. As the atomized crude oil strikes the tubes 10 heated to a temperature depending upon the composition of the crude oil, this latter is decomposed and the gasoline vapors formed instantly are separated from the oil and enter through the perforated plate 26 into the filter chamber in which they pass between the filter material impregnated with acids and are freed from carbonaceous and other foreign matter, escaping automatically through the condenser tube 31 where they are condensed and cooled before reaching the storage tank. The sulphureous vapors and other gases formed during the process escape through the chimney 35. The first residue (PGA) of the cracking material flows automatically into the vaporization tank 46 located at a lower level, where the second distillation process, production of kerosene, takes place.

The vaporization tank 46 employs the same kind of electric heating system as the tank 7, with the difference that it contains a greater number of heating elements, as the temperature to be obtained is higher for the separation of petroleum distillate from the first residue. This distillate is discharged automatically through the pipe 66 into its own condenser system.

The second residue (GA) flows through the circulation pipe 71 automatically into the fractionation tank 78, placed at a still lower level, where the distillation process is the same as in the vaporization tank 46. If necessary, the temperature of the cracking material GA, after leaving the tank 46, is increased in the superheater 74, before it enters the fractionation tank 78. This tank is operated at a still higher temperature, as in this third distillation process the gas oil is separated. Through its discharge pipe the gas oil distillate flows automatically to its condenser system, and the third residue, asphalt and analogous products, is discharged through the pipe 88.

Both the vaporization tank 46 and the fractionation tank 78 are provided with vaporization devices which may be used simultaneously with the triple cracking process for producing intermediate distillates, depending upon the composition of the crude oil being treated. These intermediate vaporization devices are further provided with chimney or escape pipes for the discharge of sulphureous vapors and gases which may still be present.

What I claim is:

A heater for use in treating oil, said heater comprising a tube of refractory material, a metal tube enclosing said first-named tube, said metal tube having heat-radiating fins thereon, the metal of which the tube and fins are made having a relatively high melting point, an outer tube of metal, said outer tube having a good heat conductivity, a refractory granular electrical resistance material within the innermost tube, said material being composed of graphitic carbon, silicon carbide, and clay, means for protecting said material against oxidation, comprising a refractory coating containing a compound of a metal of the group consisting of molybdenum and tungsten, electrodes in contact with the ends of the column of granular material, and means for varying the pressure of said electrodes on said material to control the resistance thereof at will.

WILLIAM HOMFELDT.